Oct. 2, 1962     A. J. BURMEISTER ET AL     3,056,360
CONVEYOR SYSTEM AND CONTROL
Filed Aug. 17, 1959     8 Sheets-Sheet 1

INVENTORS.
Albert J. Burmeister,
Willard D. Brown Jr.,

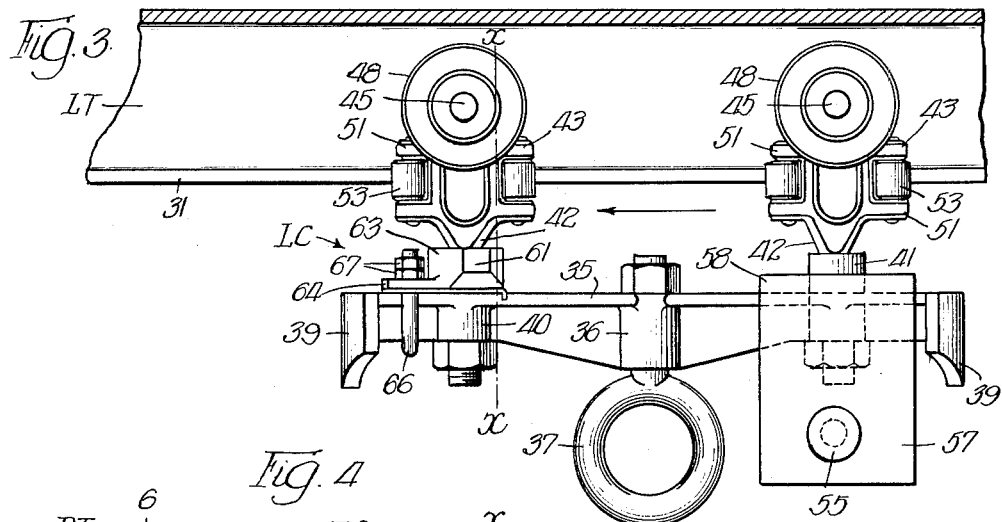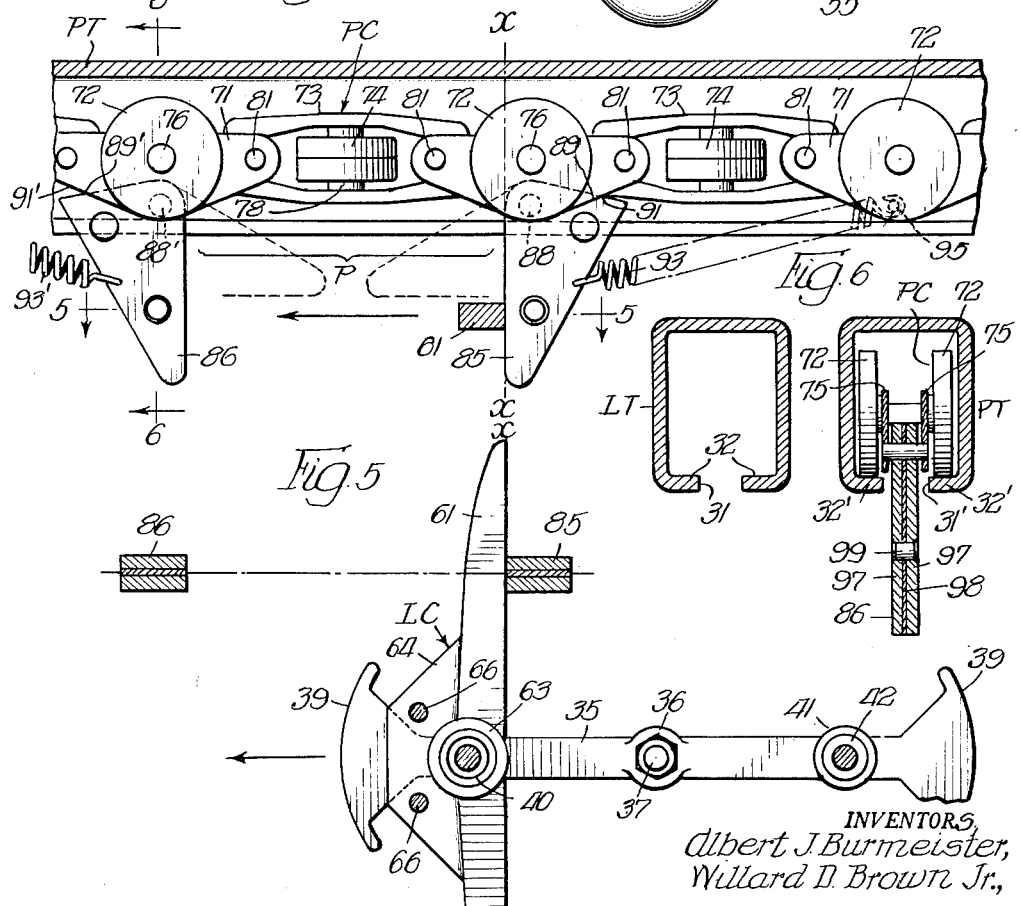

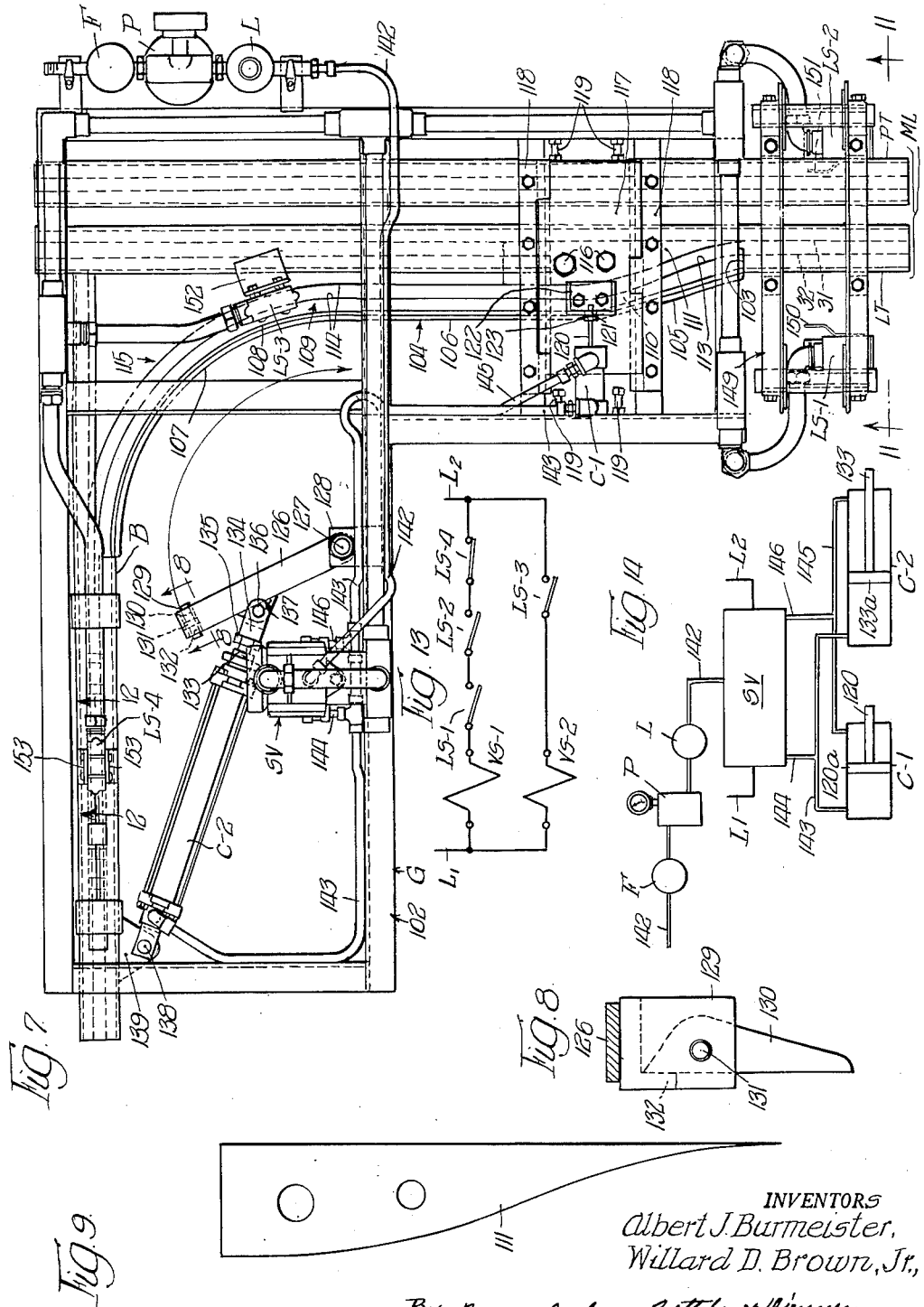

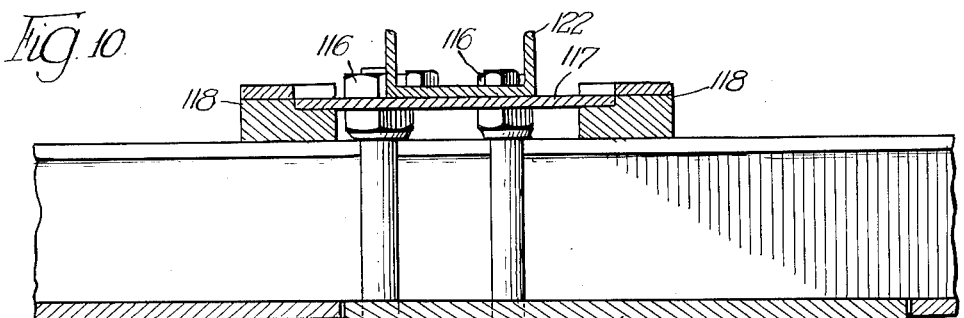
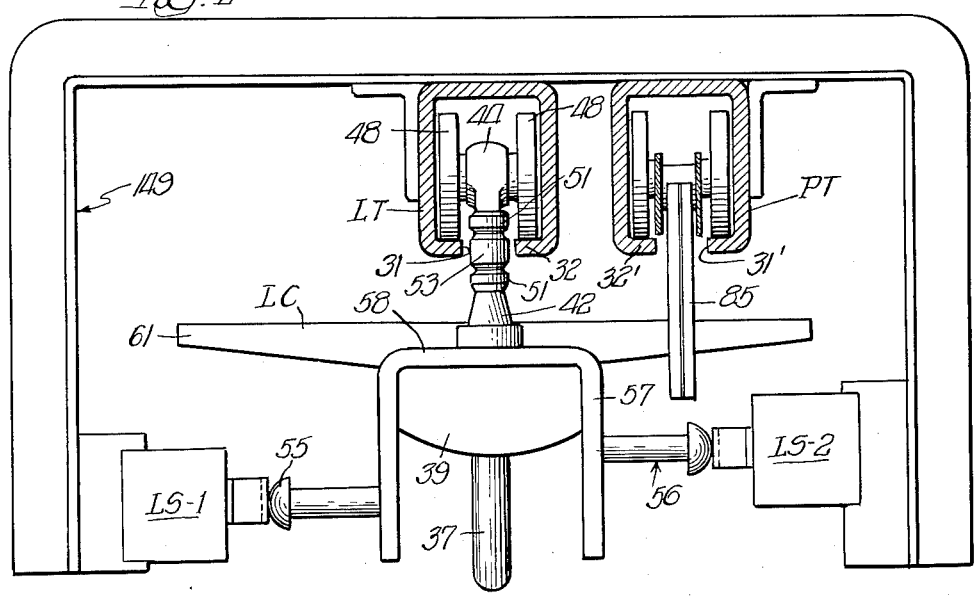
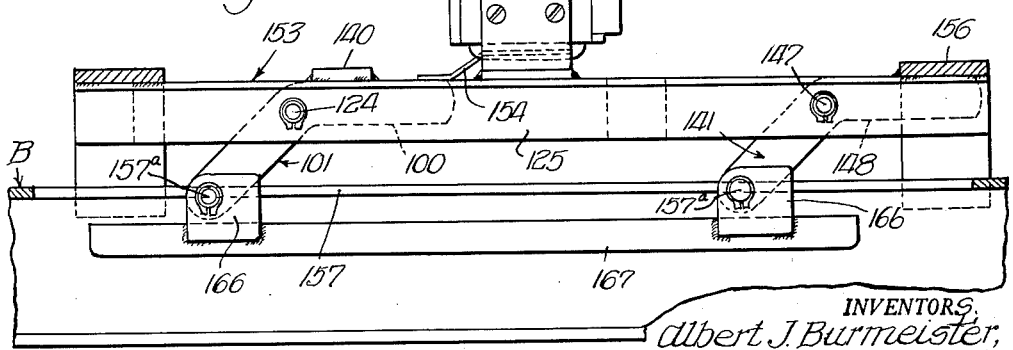

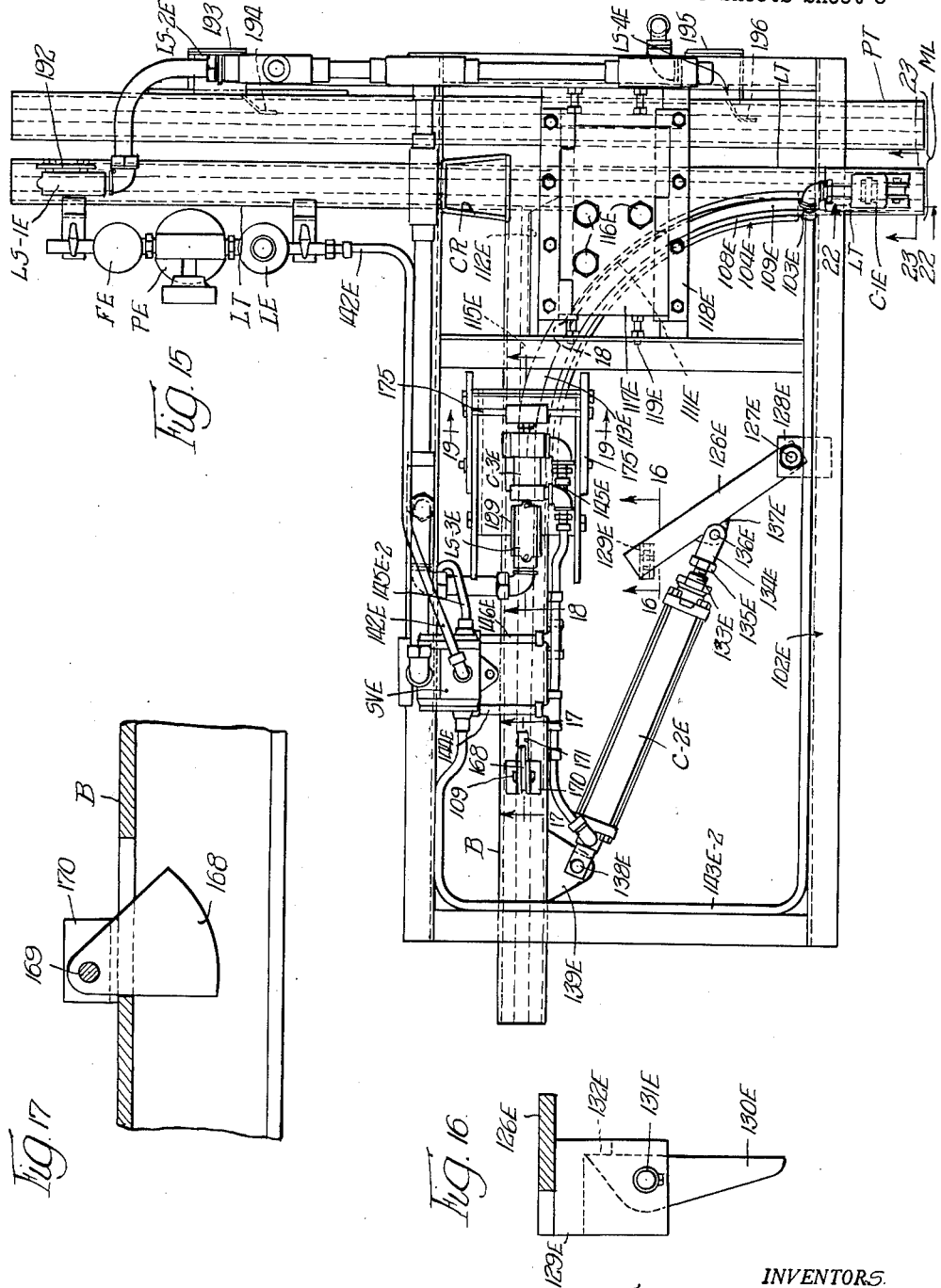

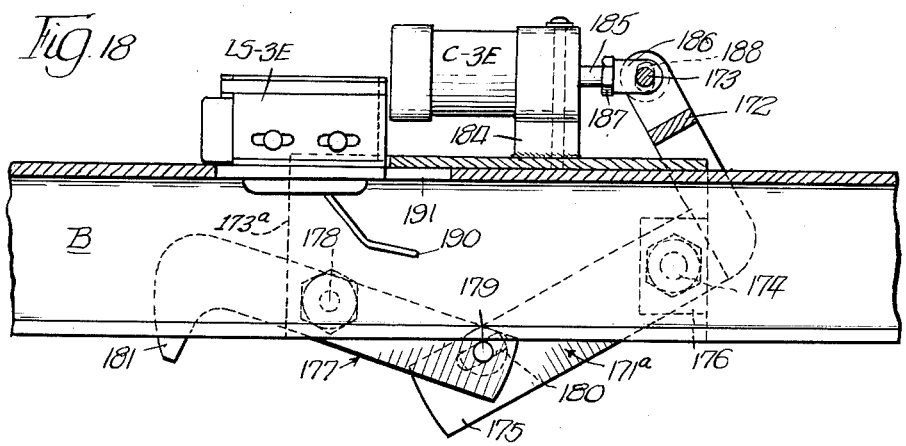
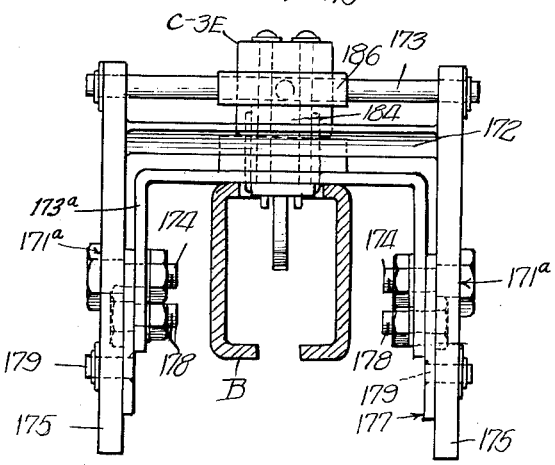
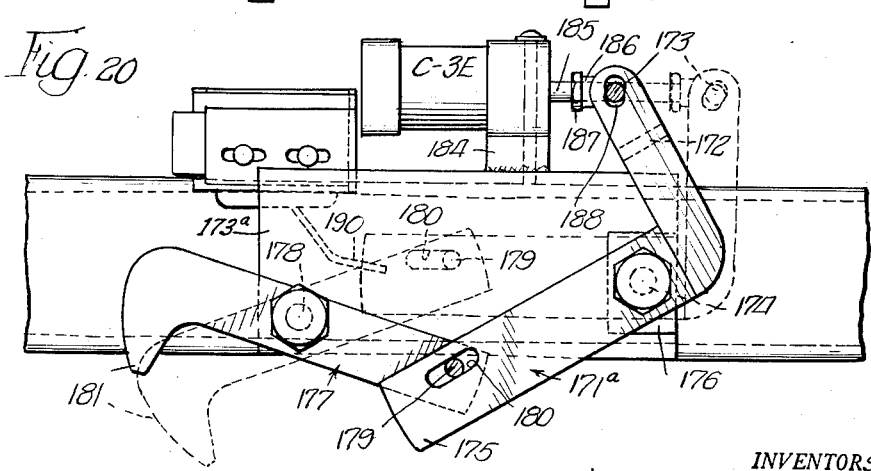

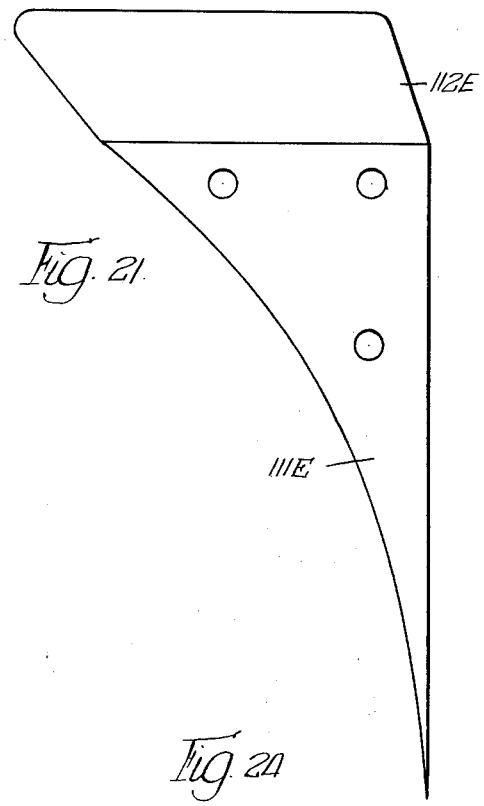
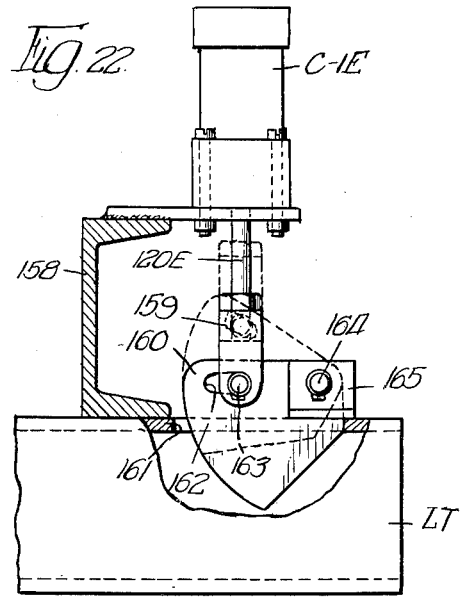
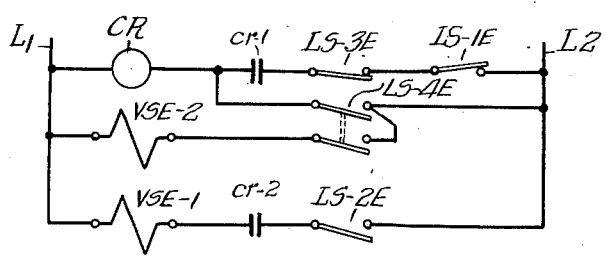
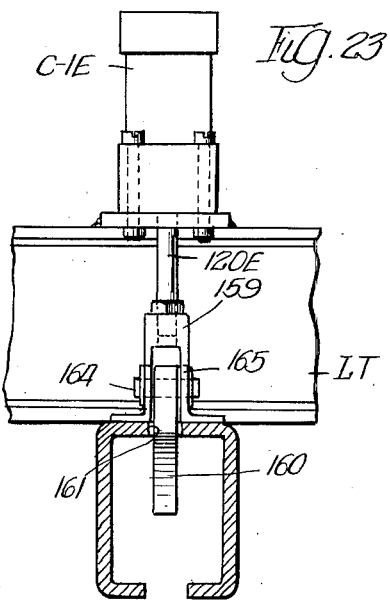
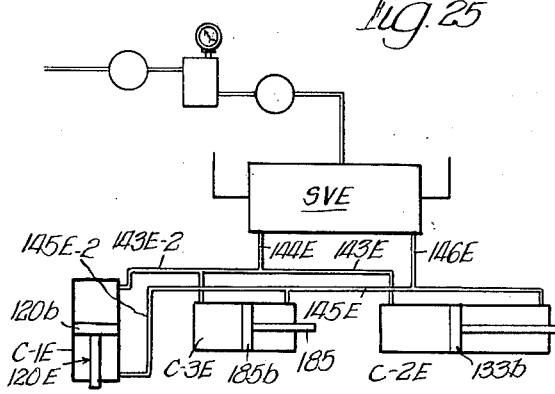

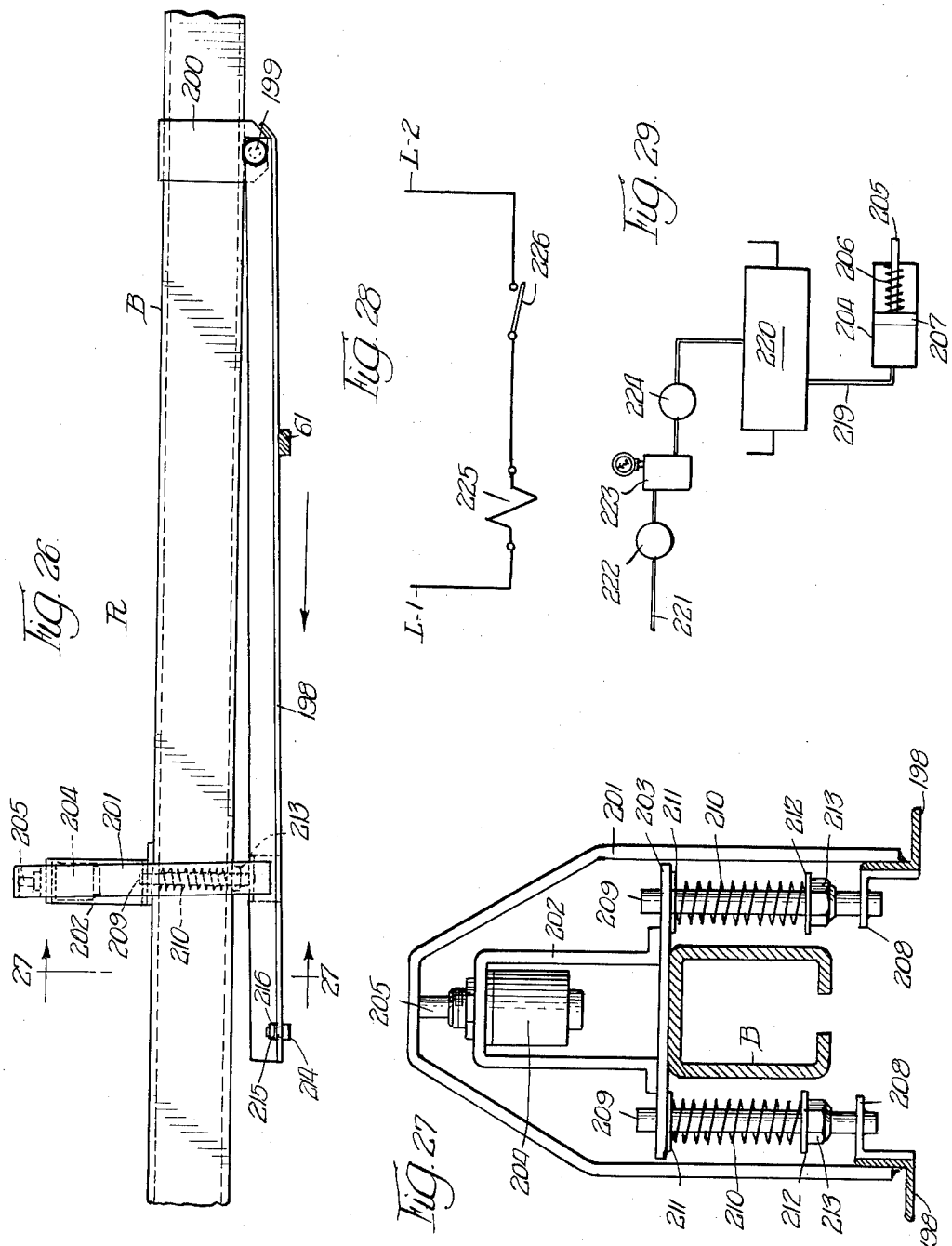

United States Patent Office 3,056,360
Patented Oct. 2, 1962

3,056,360
CONVEYOR SYSTEM AND CONTROL
Albert J. Burmeister and Willard D. Brown, Jr., Aurora, Ill., assignors to Richards-Wilcox Manufacturing Company, Aurora, Ill., a corporation of Illinois
Filed Aug. 17, 1959, Ser. No. 834,101
16 Claims. (Cl. 104—96)

The present invention relates to automatic dispatch conveyor systems, and particularly to such systems of the overhead track type wherein wheeled load supporting carriages travel along an overhead track to convey manufactured articles or other goods from place to place in a factory, shop or the like. As illustrative of one type of conveyor situation to which our invention is applicable, it may be used in a factory or shop to convey newly manufactured parts from a painting zone, where the parts are painted, to storage tracks where the suspended parts are allowed to dry, following which the carriers carry the parts back along the main track to an assembly station, packing station or the like.

It is one of the general objects of the present invention to provide an automatic dispatch conveyor system of the above general description which utilizes side-by-side twin tracks extending over that portion of the installation where the load carriers are power propelled. The wheeled load carriers roll along one of these twin tracks, and traveling along the other track is the drive chain which transmits propelling force to the wheeled load carriers. The side-by-side location of the twin tracks reduces the required head room for the installation of the system; simplifies the operation of switching the load carriers from a main track on to storage tracks, and thence back to the main track; and possesses other advantages which will hereinafter appear.

Another object of the invention is to provide improved feed-in switch units and improved escapement switch units. The feed-in switch units operate to divert or "feed-in" the load carriers from a main track on to one or more storage tracks or service tracks where the goods are temporarily stored, or where their travel is suspended or delayed while service is being performed upon the goods. The escapement switch units serve to effect the escapement or return of the load carriers from the storage tracks or service tracks back to the main track upon the completion of the storage or service. These feed-in and escapement switch units are of the pneumatically operated type, being governed by suitable controls.

It is known to provide, in conveyor systems of the above character, feed-in and escapement switch units operated by electric motors. Such switch units are rather complicated and costly and have proved to be unreliable in use. An important object of our invention is to provide pneumatically operated feed-in switch units of comparatively simple and inexpensive construction and operation, which are reliable and accurate in operation. A further object is the provision of novel switch points or frogs in the feed-in and the escapement switch units, which assure speed and accuracy in operation, but comparatively little power being required to operate the feed-in switch unit, the switch point or frog of the escapement switch being operated automatically by the carriers and no further power being required, for that purpose. It is also an object of our invention to provide improved retarder means for retarding or holding back loaded carriers travelling down the inclined portions of the storage tracks, as may be required. Further objects and advantages of our invention will appear from the detail description.

In the drawings:
FIGURE 1 is a diagrammatic plan view of the track layout of one type of installation of our automatic dispatch conveyor system;

FIGURE 3 is a vertical sectional view taken substantially on line 3—3 of FIGURE 2;

FIGURE 4 is a vertical sectional view taken substantially on line 4—4 of FIGURE 2, showing the pusher chain with its pairs of pusher and hold-back dogs;

FIGURE 5 is a fragmentary horizontal sectional view taken substantially on line 5—5 of FIGURE 4, this FIGURE together with FIGURES 3 and 4 being located with their pusher planes x—x in vertical alignment;

FIGURE 6 is a detail sectional view taken substantially on line 6—6 of FIGURE 4;

FIGURE 7 is a plan view of one of the feed-in track switch units used between the main line portion of the track system and one of the storage or service tracks;

FIGURE 8 is a sectional view on an enlarged scale taken substantially on line 8—8 of FIGURE 7;

FIGURE 9 is a plan view, on an enlarged scale, of the switch point or frog of one of the feed-in switch units;

FIGURE 10 is a fragmentary lengthwise sectional view of the load track and the switch point or frog of the adjacent feed-in switch unit on an enlarged scale;

FIGURE 11 is a sectional view, on an enlarged scale, taken substantially on line 11—11 of FIGURE 7;

FIGURE 12 is a sectional view, on an enlarged scale, taken substantially on line 12—12 of FIGURE 7, the sensing switch being shown in elevation and the associated track being shown fragmentarily and in lengthwise section;

FIGURE 13 is a schematic wiring diagram of the limit switches and the sensing switch of the feed-in switch unit of FIGURE 7;

FIGURE 14 is a schematic diagram of the pneumatic circuit of the power cylinders for the feed-in switch unit of FIGURE 7;

FIGURE 15 is a plan view of one of the escapement switch units used between the main line portion of the track system and one of the storage or service tracks;

FIGURE 16 is a sectional view, on an enlarged scale, taken substantially on line 16—16 of FIGURE 15;

FIGURE 17 is a sectional view, on an enlarged scale, taken substantially on line 17—17 of FIGURE 15, the load carrier back stop being shown in side elevation and in its normal lowered position;

FIGURE 18 is a sectional view, on an enlarged scale, taken substantially on line 18—18 of FIGURE 15, the limit switch being shown in elevation and the associated track being shown fragmentarily and in lengthwise section;

FIGURE 19 is a sectional view, on an enlarged scale, taken substantially on line 19—19 of FIGURE 15, but showing the exit stop means in end elevation and in normal lowered position;

FIGURE 20 is a side view, on an enlarged scale, of the exit stop means of FIGURE 19 and associated parts, certain parts being broken away and shown in section, the stop means being shown in normal position, with the primary stop elements thereof lowered and the secondary stop elements raised, in full lines and in raised position in broken lines;

FIGURE 21 is a plan view, on an enlarged scale, of the switch point or frog of the escapment switch unit of FIGURE 15;

FIGURE 22 is a sectional view, on an enlarged scale, taken substantially on line 22—22 of FIGURE 15, with the escapement stop shown in its down position in full lines and in its raised position in broken lines, the associated rail being in part broken away to show the slot in the top thereof through which the stop passes;

FIGURE 23 is a sectional view, on an enlarged scale, taken substantially on line 23—23 of FIGURE 15;

FIGURE 24 is a schematic wiring diagram of the electrical switches of the escapement switch unit;

FIGURE 25 is a schematic diagram of the pneumatic system of the escapement switch unit;

FIGURE 26 is a side view of a retarder for use on the gravity operated storage lines;

FIGURE 27 is a sectional view, on an enlarged scale, taken substantially on line 27—27 of FIGURE 26;

FIGURE 28 is a schematic wiring diagram of the retarder control means; and

FIGURE 29 is a schematic diagram of the retarder pneumatic circuit.

Figure 1:
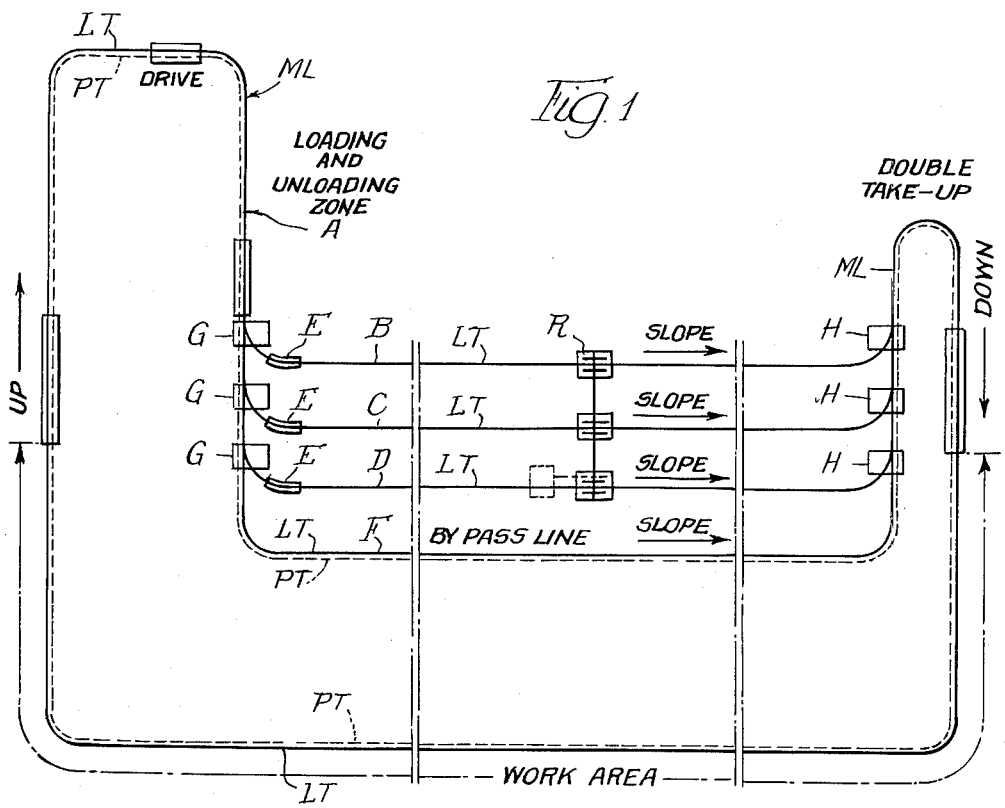

Referring first to FIGURE 1, this illustrates diagrammatically in plan a very basic layout of an automatic dispatch conveyor system. Those portions of this track layout which are shown in full lines represent load tracks LT along which the load supporting carriers travel. The closed loop portion of the layout shown in dotted lines represents the power track PT in which travels a power driven pusher chain for propelling the load supporting carriers along the load track LT lying in horizontally spaced side-by-side relation to the power track PT (see FIGURES 2 to 6). In this basic layout, a loading and unloading zone is indicated at A, where the manufactured articles or other goods are loaded upon and unloaded from the wheeled load carriers. Branching from the main line just beyond this loading and unloading zone A are three storage lines B, C, and D, each consisting solely of a load track LT without any juxtaposed power track PT. At the entrance end of each of these storage lines B—D is a full line sensing device E, which assumes a certain control position when its particular storage line becomes filled up with load carriers. For example, when non-selective load carriers are used, the first storage line B will fill up with load carriers until its full sensing device E renders the feed-in switch inactive. Thereupon, storage line C will load up until its full line sensing device E renders its feed-in switch inactive. Thereupon, storage line D will fill up until its full line sensing device E responds by rendering its feed-in switch inactive. Following this, subsequent load carriers will continue on around through by-pass line F and back to the starting point, from whence they will repeat the cycle of trying to get into one of the storage lines B, C or D.

The automatic feed-in switches which feed in or divert the load carriers from the main line ML to the branch storage lines, B, C and D, are diagrammatically illustrated in FIGURE 1 at G. The automatic escapement switch units which return the load carriers from the branch storage line B, C and D back on to the main line ML are diagrammatically illustrated at H. If desired, each of the branch storage lines B, C and D may have a retarder device interposed therein. The desirability or necessity of such retarder device depends upon the length of each storage line, the slope of the line, the weight of the load carried by each load carrier, and the susceptibility of the load to damage resulting from the possible end bumping of the load carriers on the storage lines. Such retarder device will be later discussed.

It will be understood that the movement of the load carriers along the branch storage tracks B, C and D occurs solely under the action of gravity by reason of the downhill slope of these tracks, there being no power track or pusher chain associated with any of these storage lines. The different uphill and downhill slopes in the system are denoted in FIGURE 1.

Figure 2:
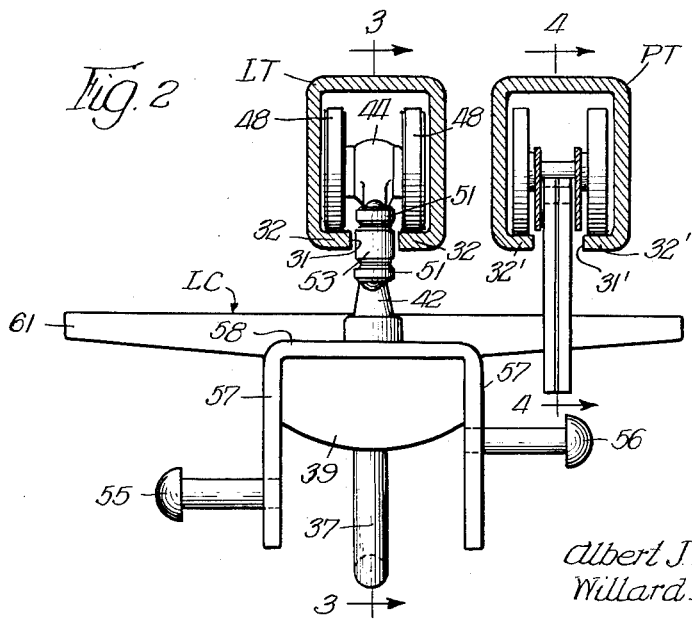
FIGURE 2 is a transverse sectional view through parallel side-by-side sections of the load track and power track, with a load carrier in the load track and the pusher chain in the power track, and showing the pushing relation between the two.

Referring now to the load track LT and the power track PT, it will be seen from FIGURES 2 and 6 that both of these tracks are of rectangular box-like section having longitudinally extending central slots 31 and 31' in their bottom walls. The flange lips 32 and 32' lying on both sides of the slots 31, 31' constitute the supporting rails along which roll the vertical wheels or rollers of the load carriers and also of the pusher chain.

Referring to FIGURE 3, each load carrier LC comprises a main horizontal load bar 35, which may be of different lengths for different load carrying capacities, ranging from approximately 10 inches to 16 inches in length. Formed centrally in this load bar 35 is a vertical boss 36 in which is mounted a depending eye bolt 37, or other suitable load suspension device. The ends of the load bar 35 are formed with curved bumpers 39 for bumping engagement with adjacent load carriers. Formed adjacent the front and rear ends of the load bar 35 are front and rear vertical bosses 40 and 41 respectively, in both of which bosses the shanks 42 of wheeled suspension hangers or wheel trucks 43 have swiveled mounting for rotation about vertical axes. At the upper end of each wheel truck is a horizontal boss 44 (FIGURE 2) from the opposite sides of which project a pivot pin or pins 45. Rotatably mounted on anti-friction ball bearings carried on such horizontal pivot pin or pins 45 are vertical load supporting wheels or rollers 48 which roll along the supporting flanges 32 at opposite sides of the central slot 31 in the load track LT.

Formed to extend from the front and rear sides of each wheel truck 43 in the fore-and-aft plane of the track slot 31 are upper and lower fork arms 51 carrying vertical pivot pins on which are rotatably mounted vertical guide rollers 53. These guide rollers have a loose rolling clearance in the track slot 31, and function to carry the side load incident to following the track slot 31, particularly in rounding curves.

In FIGURES 2 and 3 we have shown the load carrier as provided with a very simple arrangement of station selecting pins. These comprise left hand selector pin 55 and right hand selector pin 56, which project horizontally outwardly to the left and to the right from the side flanges 57 of an inverted U-shaped stirrup 58. This stirrup has a central aperture in the cross bar portion thereof that fits down over the rear vertical boss 41 of the load bar, the depending side flange 57 having a snug fit against the side edges of the load bar 35. These selector pins 55, 56 are mounted at coded heights in the side flanges 57 so as to actuate appropriate selector switches in the travel of the load carrier, whereby to actuate certain feed-in switches, etc. as will be hereinafter described in detail.

The propelling power of the pusher chain PC traveling in the power track PT is transmitted to the load carrier LC through a transversely extending pusher bar 61 having arms extending outwardly from the opposite sides of the load bar 35, adjacent to the front end thereof. As shown in FIGURE 5, this pusher bar has a central boss 63 which fits down over the front vertical boss 40 of the load bar. An apertured flange 64 projects forwardly from the central portion of the pusher bar, and passing upwardly through the apertures in said flange 64 are the threaded side arms of a U-shaped clevis 66 which embraces the underside of the load bar 35. These side arms of the clevis receive nuts 67 which rigidly clamp the clevis 66 and pusher bar 61 to the load bar 35. That portion of the pusher bar that projects toward the power track PT lies directly below the central slot 31' in the power track PT in position to be engaged by propelling dogs mounted on the pusher chain PC travelling in the power track.

Referring to FIGURE 4, the pusher chain, designated PC, is quite similar to the conveyor type of power driven chain disclosed in Hassler Patent No. 2,372,199 issued March 27, 1945. This chain comprises an alternating series of vertical links 71 mounting vertical wheels 72, and horizontal links 73 mounting horizontal wheels 74. The vertical links 71 comprise a pair of spaced side plates 75 through which passes a horizontal axle 76, on the projecting ends of which are mounted the vertical wheels 72. These vertical wheels 72 roll along the supporting flanges 32' on opposite sides of the bottom slot 31' of the power track PT. The horizontal links 73 are of chain link configuration comprising top and bottom portions through which passes a vertical axis 78 on which is pivoted a horizontal guide wheel 74. This guide wheel 74 has an outer diameter slightly less than the inside wall to wall spacing between the vertical side walls of the power track PT. These horizontal guide wheels 74, guide the power chain around horizontal curves in the power track. The vertical links 71 and the horizontal links 73 are articulated together for relative pivotal movement both horizontally and vertically, as by the provision of coupling pins 81 passing through the ends of the side plates 75 and through the loop ends of the horizontal links 73. This is all fully described in the aforesaid Hassler Patent No. 2,372,199.

At spaced points along the length of the pusher chain PC are mounted companion pairs of dogs 85 and 86 which extend down through the central slot 31' in the bottom of the power track PT. In each companion pair of dogs, the dog 85 functions as a pusher dog, and the dog 86 functions as a hold back dog, both dogs being mounted on a contiguous pair of vertical links 71. The horizontal span between the vertical front edge of the pusher dog 85 and the vertical rear edge of the hold back dog 86 constitutes a driving or control pocket $p$ into which extends the adjacent end of the pusher bar 61 projecting laterally from one of the load carriers LC. The pusher dog 85 is pivotally mounted at its upper corner between the side plates 75 of vertical link 71, on a transverse pivot pin 88. An upper stop shoulder 89 on the pusher dog 85 is normally held pressed upwardly against a cooperating stop surface 91 on the horizontal link 73, whereby the pusher dog is positively held against counter-clockwise rotation about pivot pin 88 substantially in the position shown, but whereby the pusher dog can swing in a clockwise direction around pivot pin 88, substantially as indicated in dotted lines. A tension spring 93 has its front end connected to the sloping rear edge of the pusher dog 85 and has its rear end connected to a pin 95 extending between the side plates of the next succeeding vertical link 71. Thus, it will be seen that when the pusher bar 61 of an adjacent load carrier LC is traveling forwardly faster than the pusher dog 85 it strikes the sloping rear edge of the pusher dog and cams the dog in a clockwise direction around pivot pin 88 until the pusher bar can pass beneath the pusher dog, whereupon the pusher dog snaps back to its vertical driving position illustrated in full lines. Referring now to the hold back dog 86, this is substantially a duplication of the pusher dog 85 arranged in reverse relation. The hold back dog 86 is pivotally mounted at its upper corner on pivot pin 88' carried by the next forward vertical link 71, and this hold back dog has a comparable stop shoulder 89' adapted to engage stop surface 91' on this horizontal link 73 for preventing the hold back dog from pivoting in a clockwise direction beyond the full line position shown. A tension spring 93' connected between the hold back dog and a transverse pin (not shown) similar to pin 95 and extending between the side plates of the next preceding vertical link 71, maintains the hold back dog 86 substantially in the hold back position shown in full lines, but permits this dog to pivot in a counter-clockwise direction. Thus, it will be seen that in the situation where the pusher chain PC is traveling forwardly relatively to a stationary load carrier, or is traveling forwardly at a higher speed than a moving load carrier, the pusher bar 61 will engage the sloping forward edge of the hold back dog 86, thereby camming this dog upwardly in a counterclockwise direction until the pusher bar 61 can clear the lower end of the hold back dog, whereupon the hold back dog will snap back to its normal vertical position. Accordingly, it will be seen that once the pusher bar 61 becomes confined in pocket $p$ between the pusher dog 85 and the hold back dog 86 it remains confined in this pocket until separation of the load rail from the power rail removes the pusher bar laterally from said pocket. As shown in FIGURE 6, the pusher dog 85 and hold back dog 86 are of substantially duplicate construction, each comprising two outside plates 97 and a filler plate 98, held together by transverse rivets 99.

The construction and operation of one of the feed-in switch units G are shown in FIGURES 7 to 14, inclusive. Referring to FIGURE 7, it will be seen that the power track PT extends continuously and without interruption through the unit G from the entering section of the main line ML to the exit section of the main line. A suitably mounted L-shaped frame 102 of angle iron construction in part overlies the entrance end portion of one of the storage tracks, the track B, for example, and in part overlies the main line ML. The load track LT is cut away from its inner side to the bottom slot 31 thereof, for a short distance lengthwise, providing a rectangular notch or opening 103 therein. An entrance guide member 104, secured to frame 102, seats at its outer end in the outer end of notch 103, adjacent the end of the portion of frame 102 overlying the main line ML. The guide member 104 comprises an outer straight portion 105 inclined away from load track LT and merging into a second straight portion 106, the latter portion merging into a curved portion 107 of circular curvature and extending through an arc of approximately ninety degrees. The other or inner end of guide member 104 seats in a notch cut in storage track B, at the inner side thereof, in the same manner as its outer end seats in notch 103 of load track LT. The guide member 104 is provided, adjacent and paralleling its inner side, with an upwardly extending flange 108 of substantial height and preferably of the same thickness as the inner side walls of the storage track B and the load track LT, respectively. The inner end of flange 108 seats against the contiguous end of the inner side wall of storage track B, in accurate alignment therewith, and the outer end of flange 108 seats against the adjacent end of the inner side wall of load track LT in approximate alignment therewith. The guide member 104 is further provided with a horizontal bottom flange 109 extending inwardly thereof from the upwardly extending or vertical flange 108. The bottom flange 109 is of the same width, for the major portion of its length, as the inner bottom flange 32 of storage track B and is in accurate register therewith. The outer end portion 110 of flange 109 is of approximately the same length as the notch 103 in the load track LT and has its inner edge curved inwardly and then outwardly to the inner flange 32 of track LT, the outer end of flange 109 being of the same width as, and in accurate register with, the contiguous end of flange 32.

A switch point 111 (FIGURE 9) is mounted in the gap or notch 103 of the load track LT, in the plane of portion 110 of flange 109. The switch point 111 is of approximately triangular form. The outer side edge of the switch point 111 is straight and parallel with the outer bottom flange 32 of track LT, and the inner edge thereof is curved conformably to and parallel with the inner edge of outer end portion 110 of flange 109 of guide member 104. When the switch point 111 is in its feed-in position shown in FIGURE 7, its straight outer edge abuts the inner edge of outer bottom flange 32 of track LT. The outer edge of switch point 111 is then spaced inwardly from the inner edge of portion 110 of flange 109 of member 104 defining therewith a preliminary entrance slot 113, of the same width as and leading from slots 31 of load track LT, the portion of slot 31 corresponding to notch 103 then being closed by the switch point 111. The preliminary entrance slot 113 thus provided opens, at its inner end, into a main entrance slot 114 defined by the inner edge of flange 109 of guide member 104 and the outer edge of a guide plate 115 secured in frame 102. The slot 114 is of the same width as slot 31 of load track LT and storage track B and is in accurate register with the contiguous end of the latter slot. Accordingly, when the switch point 111 is in its feed-in position it is effective for diverting an approaching loaded carrier from the load track LT onto the storage track B, as will appear more fully later. The switch point 111 is suitably secured, conveniently, by bolts 116, to an overlying slide plate 117 slidably mounted in guide strips 118 secured to frame 102 and extending transversely of the main line ML. The plate is adjusted in opposite directions to extent limited by stop bolts 119 adjustably secured in frame 102, by means of a double acting pneumatic motor or cylinder C-1 having a reciprocatory piston and piston rod 120. The outer end of piston rod 120 is threaded through a boss 121 of a bracket 122 bolted to plate 117, with a jam nut 123 threaded on piston rod 120 and seating tightly against boss 121. When the piston rod 120 is projected, the switch point 111 is in its feed-in position shown in FIGURE 7. Retraction of the piston rod 120 shifts the switch point 111 to its straight-through position, with its curved outer edge in abutting relation to the curved inner edge of portion 110 of flange 109 of guide member 108 and its straight outer edge accurately aligned with the ends of the bottom inner side flange 32 of load track LT, at the ends of notch 103, defining with the bottom outer side flange 32 of track LT a continuation of slot 31 thereof. The loaded carriers travelling along the load track LT may then by-pass the feed-in switch unit G, as will be understood. The control and operation of the switch cylinder C-1 will be described more fully hereinafter.

A loaded carrier LC diverted from load track LT by switch point 111 travels through the preliminary entrance slot 113 into the main entrance slot 114 and along the latter to the outer end of curve 107 of member 104, to position to be picked up and moved into the storage track B. That is accomplished by a sweep arm 126 pivoted at its outer end at 127, on a vertical axis, on a bracket 128 secured to the inner side of the portion of frame 102 overlying, in part, the storage track B. Referring to FIGURE 8, an inverted U-shaped bracket 129 is welded to the under face of sweep arm 126, at the inner end and transversely thereof. A gravity operated pawl 130 is pivotally mounted, adjacent its upper end and on a horizontal axis extending lengthwise of arm 126, by a pin 131 passing therethrough and through the arms of bracket 128. The leading edge of pawl 130 is inclined downward toward the following edge thereof, and the following edge of pawl 130 is vertical with its upper portion in abutting relation to a stop element or web 132 extending across the slot in bracket 129; in the normal position of pawl 130, shown in FIGURE 8. The sweep arm 126 is operated by a double action pneumatic power unit or cylinder C-2 having a reciprocatory piston to which is attached a piston rod 133 extending through a stuffing box at the inner end of cylinder C-2. The inner end of piston rod 133 is threaded into the bight portion of a U-shaped clevis 134 and receives thereon a jam nut 135 seating tightly against clevis 134. The latter is pivoted on a vertical axis, by a pivot pin 136, to a bracket 137 welded to the leading edge of arm 126 between the ends thereof. The cylinder C-2 is pivoted on a vertical axis at its outer end, by a pivot pin 138, to a bracket 139 welded to storage track B. When a loaded carrier LC is properly positioned upon the guide member 104 piston rod 133 of cylinder C-2 is projected, swinging sweep arm 126 clockwise from its normal position of FIGURE 7 inward about pivot pin 127 to a position approximately paralleling and adjacent the inner side of frame 102. As sweep arm 126 reaches its latter position, pawl 130 contacts pusher bar 61 of the carrier so as to be raised thereby and pass thereover and then drops down to position abutting the following side of pusher bar 61. Air is then admitted to cylinder C-2 at the inner end thereof, thereby retracting piston rod 133 and swinging sweep arm 126 counter-clockwise to its normal position. The pawl 130 picks up the pusher bar 61 of the carrier and sweeps the latter about curve 107 of guide member 104 and into the storage track B, the pawl 130 being then restrained against movement about pivot pin 131 by the web stop element 132 of bracket 129. When the sweep arm reaches the end of its return stroke, pusher bar 61 passes out of contact with the pawl 130. The control and operation of the cylinder C-2 will be stated more fully presently.

Admission and exhaust of compressed air to and from the cylinders C-1 and C-2 are controlled by a solenoid operated valve SV of known type, preferably, though not necessarily, a valve known as the "Electroaire" valve. Air under appropriate pressure is supplied, from any suitable source, to a main air supply conduit 142 mounted on frame 102 and connected to the valve SV for supplying operating air thereto. The conduit 142 preferably has interposed therein an air filter F, a pressure regulator P, and a lubricator L, the last for supplying a suitable lubricant to the air, all of known type and operation. A second air conduit 143, mounted on frame 102, is connected at one end to the outer end of cylinder C-1 and is connected at its other end to the outer end of cylinder C-2. The conduit 143 is further appropriately connected by a nipple 144, to the air control valve SV. A third air conduit 145 is connected at one end to the inner end of cylinder C-1 and is connected at its other end to the inner end of cylinder C-2. Conduit 145 is also appropriately connected to the air control valve SV by a nipple 146. As shown, and as will be understood, suitable known fittings are provided for effecting the connections between the air conduits and associated parts.

Referring to FIGURES 11 to 14, inclusive, two electrical limit switches LS-1 and LS-2 are mounted on a bracket frame 149 mounted on and extending across the main line ML a short distance in advance of guide member 104. The switches LS-1 and LS-2 are microswitches of suitable known type, are at opposite sides of and equidistant from the load track LT and are so disposed that their operating arms 150 and 151, respectively, will be actuated by the selector pins 55 and 56 of a load carrier LC approaching the feed-in switch unit G along the load track LT. A third limit switch LS-3, which may be any suitable type of micro-switch is mounted, by a bracket 152 on the load track LT and overlies the curve 107 of the guide member 104. The operating arm of switch LS-3 is disposed above the main entrance slot 114 and is inclined downward in the direction of travel of a carrier moving along guide member 104 to the storage track B. A fourth limit switch LS-4, which also may be any suitable type of micro-switch, is mounted on a bracket structure 153, shown more clearly in FIGURE 12, secured to and overlying the entrance end of storage track B. The operating arm 154 of switch LS-4 normally is held in raised position by finger 100 of an angle lever 101 pivoted at 124 between two angle rails 125 of bracket structure 153. Upward movement of finger 100 is limited by a cross plate 140 welded to the top of the rails 125, which define between them a slot receiving finger 100 and the switch operating arm 154, when the latter is moved to its lowered position opening switch LS-4. Normally, switch operating arm 124 is held in its raised position shown and switch LS-4 is closed. A second angle lever 141, similar to angle lever 100, is pivoted at 147 between the angle rails 125, spaced an appropriate distance from angle lever 100. Upward movement of finger 148 is limited by a cross plate 156 welded to the top of the rails 125. The top wall of storage track B is provided with a central lengthwise slot 157, through which the lower fingers or arms of angle levers 101 and 141 extend. The lower end of the lower arm of each of the angle levers 101 and 141 is pivoted, at 157a, between two plates 166, welded to and extending upward from a trip bar 167. As will be understood from the above, the bar 167 is supported in horizontal position extending lengthwise of track B centrally thereof. The bar 167 normally is positioned as shown in FIGURE 12, being then at a height such that it will be raised by the wheel trucks of a carrier entering track B. Raising of bar 167 releases operating arm 154 of switch LS-4 which then moves downward effective for opening switch LS-4, as will be understood from what has been said. The operating arm of switch LS-3 is also disposed to be actuated by the wheel trucks of the carriers, as will appear more fully presently.

Referring to FIGURES 13 and 14, the air control valve SV is operated by two solenoids VS-1 and VS-2. The solenoid VS-1 is connected across the electric power lines L-1 and L-2 in series with the switches LS-1, LS-2 and LS-4, the switches LS-1 and LS-2 being normally open and the switch LS-4 being normally held close. The solenoid VS-2 is connected across the power lines L-1 and L-2 in series with the switch LS-3 which normally is opened. Assuming the piston rod 120 of the cylinder C-1 to be retracted, with the switch point 111 in its straight-through position, previously described, the selector pins 55 and 56 of the carrier approaching the feed-in switch unit along the load track LT close the switches LS-1 and LS-2 thereby energizing the solenoid VS-1 of the solenoid air control valve SV. That admits air to the cylinders C-1 and C-2 between the outer ends thereof and the pistons 120a and 133a, respectively, of such cylinders, thereby projecting the piston rods 120 and 133. The cylinder C-1 shifts the switch point 111 to its feed-in position shown in FIGURE 7 and the cylinder C-2 swings the sweep arm 126 to position for engagement of the pawl 130 with the pusher bar 61 of the carrier for propelling it about the curve 107, onto the storage track in the manner previously described, the switch point 111 being shifted to feed-in position in advance of the sweep arm 126 reaching the limit of its clockwise movement, due to the fact that the stroke of piston rod 120 of the cylinder C-1 is much shorter than the stroke of the piston rod 133 of the piston C-2. As the carrier continues its travel along the guide member 104 its front wheel truck actuates the operating arm of switch LS-3 effective for closing the latter, the switches LS-1 and LS-2 being opened due to passage there beyond of the selector pins 55 and 56 of the carrier. Closing of the switch LS-3 energizes solenoid VS-2 of the solenoid air control valve SV, effective for admitting air to the cylinders C-1 and C-2 between the inner ends and the pistons 120a and 133a, respectively, thereof, and for exhausting air from the cylinders C-1 and C-2 between the outer ends and the pistons 120a and 133a, respectively, thereof. The switch point 111 is then returned to its normal straight-through position by the cylinder C-1 and the sweep arm 126 is swung in counter clockwise direction to its normal position by the cylinder C-2, thereby sweeping the carrier into the storage track. As the carrier enters the storage track the wheel trucks thereof momentarily open the switch LS-4, but that does not affect the operation due to the fact that the solenoid VS-2 of the solenoid control valve SV has previously been energized as and for the purposes above stated. Likewise, the following wheel truck of the entering carrier momentarily closes the switch LS-3, but that also does not affect the operation of the feed-in switch unit G, due to the fact that the solenoid VS-2 of the solenoid air control valve SV has previously been energized and accomplished its intended purpose. The switch LS-4 is a sensing switch and corresponds to the sensing device E of the diagram of FIGURE 1. When the storage track such as the track B, becomes completely filled with carriers, the following wheel truck of the last carrier adjacent the feed-in switch unit holds trip bar 167 raised. That releases the operating arm 154 of switch LS-4 which then moves to its lowered position effective for holding that switch open. That precludes energizing of the solenoid VS-1 of the air control valve SV and renders ineffective closing of the switches LS-1 and LS-2 by the selector pins 55 and 56 of the carrier approaching the feed-in switch unit along the load track LT. The piston rod 120 of cylinder C-1 is then held in its retracted position effective for holding the switch point 111 in its straight-through position, so that the approaching carrier continues its travel along the load track LT, bypassing the feed-in switch unit, such carrier continuing its travel along the load track until it reaches the feed-in switch unit of another storage track having available storage space, onto which the carrier may be diverted in the manner above described. In practice the wiring for the limit switches and the air control valve SV is enclosed within protective conduit means, including the usual accessories, as will be understood, such conduit means being omitted from the drawings in the interest of clearness of illustration.

The escapement switch unit H is, in certain respects, similar to the feed-in unit G. It includes a rectangular angle iron frame 102E suitably mounted above and in part overlying the storage track B and in part overlying the main line ML. The load track LT is cut away to provide a lengthwise opening or notch 103E therein receiving at one end portion thereof one end of an arcuate guide member 104E having an upwardly extending vertical guide flange 108E and a horizontal bottom flange 109E concentric with and extending inwardly from the vertical flange 108E. The other end portion of the guide member 104E fits into a notch cut in the inner side of storage track B and extending across the bottom slot of that track, it being noted that the vertical guide flange 108E is of the same thickness as the inner side wall of the load track LT and of the storage track B, respectively, with its ends disposed in accurate register therewith. A substantially triangular switch point 111E, shown more clearly in FIGURE 21, is mounted in the gap or notch 103E of the load track LT. The outer edge of switch point 111E is straight lengthwise and the inner edge thereof, i.e., the edge toward flange 109E of guide member 104E, is curved conformably to flange 109E. The switch point 111E is of reduced thickness and its wider or base end to provide a transverse flange 112E which fits into corresponding recesses in the adjacent bottom flange 32 of the load track LT and in the underface of a guide plate 115E mounted on frame 102E, the inner edge of such plate being curved conformably to flange 109E of guide member 104E and defining therewith a preliminary exit slot 113E opening into the bottom slot of the storage track B in accurate register therewith. The ends of flange 112E of switch point 111E are beveled or inclined inwardly toward the storage track B, as shown in FIGURE 15. The switch point 111E is rigidly secured, conveniently by bolts 116E to an overlying slide plate 117E slidably mounted in guide strips 118E mounted on frame 102E. Movement of the plate 117E in either direction is limited by adjustable stop bolts 119E secured in the frame 102E. When the switch point 111E is in its straight-through position shown in FIGURE 15, the straight outer edge thereof is aligned with the inner edge of the adjacent bottom flange 32 of the load track LT for passage of a carrier therealong. In that position of the switch point 111E, the inclined inner end of flange 112E thereof extends a substantial distance across the adjacent end of the preliminary exit slot 113E, as shown in FIGURE 15. Accordingly, a vertical roller 53 of the leading wheel truck of a carrier being delivered from the storage track B will contact the inner end of flange 112E thereby shifting the switch point 111E toward the right, as viewed in FIGURE 15, to its escapement or delivery position, in which the curved inner edge of the switch point 111E provides a continuation of the curved inner edge of the guide plate 115E providing, with the portion of flange 109E corresponding to the inner edge of switch point 111E, a main exit slot extending from the preliminary exit slot 113E to the bottom slot of the load track LT and in accurate register therewith. In the escapement or delivery position of switch point 111E the inclined outer end of flange 112E thereof extends a substantial distance across the slot 31 of the load track LT, as will be clear from FIGURES 15 and 21. Accordingly, a vertical roller 53 of the leading wheel truck of a carrier travelling along load track LT will contact the outer end of flange 112E thereby shifting the switch point to the left, as viewed in FIGURE 15, to its straight-through position shown, following delivery of a carrier from the storage track B. The switch point 111E is thus automatically shifted as required by the carrier thereby eliminating necessity of providing additional power operated shifting means, conducive to simplicity and reduced expense in the operation of the escapement switch unit.

A double acting pneumatic cylinder C-1E is mounted in vertical position in overlying relation to the load track LT a short distance beyond frame 102E, by a bracket 158, shown more clearly in FIGURE 23. The lower end of piston rod 120 E of cylinder C-1E is secured to a shackle 159 straddling the upper edge of an escapement stop pawl 160 operating through a lengthwise slot 161 at the center of the top wall of the load track LT. The pawl 160 is provided, at its upper forward corner with a lengthwise slot 162 through which extends a pivot pin 163 suitably secured in the ends of the arms of shackle 159. The stop pawl 160 is pivoted at its upper outer corner, by means of a pivot pin 164 passing therethrough and secured through brackets 165 welded to the top wall of the load track LT. When the piston rod 120E of the cylinder C-1E is projected the stop pawl 160 is held in its lowered position with its rearward end contacting the rearward end of slot 161, as shown in FIGURE 23. It is then disposed to contact the leading wheel truck of a carrier passing from the escapement switch unit to the load track LT, as will be explained more fully presently. A second double acting pneumatic cylinder C-2E is pivoted at its outer end, by a pivot pin 138E, on a bracket 139E secured to the storage track B. The inner end of piston 133E of cyinder C-2E is pivoted, by means of a clevis 134E with an associated jam nut 135E and a pivot pin 136E, to a bracket 137E welded to the outer or following edge of a sweep arm 126E pivoted at one end, by a pivot pin 127E, to a bracket 128E welded to frame 102E. A bracket 129E, shown more clearly in FIGURE 16, of inverted U-shape, is welded to the underface of sweep arm 126E adjacent the inner or free end thereof. A gravity operated pawl 130E is pivoted by a pivot pin 131E in bracket 129E and normally is disposed with its leading edge in vertical position with the upper portion thereof in contact with a stop element or web 132E of the bracket 129E, as shown in FIGURE 16. When the piston rod 133E of the cylinder C-2E is projected, swinging sweep arm 126E in clockwise direction, the pawl 130E contacts the pusher bar 61 of a load carriage or carrier LC at the exit end of the escapement switch unit H and propels the carrier along the curved guide member 104E to the load track LT and when the piston 133E is retracted, swinging arm 126E in counterclockwise direction to its normal position, the pawl 130E is raised and passes over the pusher bar 61 of a carrier then positioned at the exit end of the storage track B; as hereinafter more fully explained.

A gravity stop pawl 168 is pivoted at its upper end, by a pivot pin 169, between brackets 170 secured to the top wall of the storage track B. Pawl 168 extends downward through a central lengthwise slot 171 in the top wall of track B, with its following edge normally in contact with the inner end of slot 171. It is disposed to be contacted and raised by the wheel trucks of a load carrier entering the exit end of track B and to contact the following wheel truck of such carrier LC positioned on that end of track B, effective for holding that carrier against movement inward along that track. The stop pawl 168 provides a back stop cooperating with exit stop means at the exit end of track B for properly positioning thereon a carrier to be transferred to the load track LT. Referring to FIGURES 15 and 18 to 20, inclusive, the exit stop means comprises two fabricated side arms 171a of substantially L-shape secured together at their upper portion by a reinforcing cross member 172 and receiving at their upper ends a cross rod 173 passing therethrough and restrained against lengthwise movement in a suitable known manner. The arms 171a provide, in conjunction with the cross member 172 and rod 173 a substantially U-shaped structure which straddles the exit end of track B and is pivoted to the sides of a U-shaped bracket 173a, also straddling track B and secured thereto, by pivot bolts 174, the lower members 175 of arms 171a being spaced from the sides of bracket 173a by pads or blocks 176 welded thereto. When the stop means is in its normal position, as shown in full lines in FIGURE 20, the lower arms 175 thereof are inclined downward and toward the back stop pawl 168, with their lower ends disposed for contact by the pusher bar 61 of a carrier positioned on track B with its following wheel truck in contact with the back stop pawl 168, the carrier then being properly positioned for its pusher bar 61 to be picked up by the pawl 130E of the sweep arm 126E when the latter is swung clockwise, for moving the carrier about the curved guide member 104E. A primary stop arm 177 is pivoted on each side of the bracket 173a, by pivot bolt 178 disposed at about the mid-length thereof. The arms 177 are provided at their outer ends with pivot pins 179 passing therethrough and through slots 180 in the lower portions or arms 175 of the L-shaped arms 170, pins 179 being restrained against endwise movement in a suitable known manner. Each of the primary stop arms 177 is provided at its other end with a downward hook-like extension 181 of generally arcuate form. When the arms 175 are in their normal position the extensions 181 of the arms 177 are raised sufficiently to clear the pusher bar 61 of the carrier so that the pusher bar is in contact with the lower or inner ends of arms 175 as and for the purpose above stated. In order to release the end carrier on the track B for delivery thereof to the load track LT, the main stop structure, comprising the arms 171a and associated parts is swung in clockwise direction to releasing position, indicated in broken lines in FIGURE 20, thus releasing the pusher bar of the leading carrier on the track B and swinging the primary stop arms 177 in counterclockwise direction to position with the extensions 181 thereof lowered for contact with the pusher bar 61 of the next succeeding carrier, effective for holding the latter against further travel until the released carrier clears the storage track B. The released carrier is then moved about the guide member 104E by the sweep arm 126E and is held in position with its leading wheel truck in contact with the exit stop pawl 160, by pawl 130E in contact with the pusher bar 61. The pusher bar of the carrier held thus positioned is then disposed to be picked up by a pair of pusher dogs 85 and 86 of the pusher chain PC traveling along the pusher track PT, the leading one of the approaching pair of pusher dogs being effective for causing raising of the exit stop pawl 160 to releasing position, the sweep arm 126E being then returned to its normal position shown in FIGURE 15 and the arms 175 and the primary arms 177 of the exit stop means being also returned to their normal positions.

The exit stop means comprising the arms 171a and associated parts is operated by a double acting pneumatic cylinder C-3E mounted above the exit end of track B on a block or pad 184 welded to the top thereof. The piston rod 185 of cylinder C-3E is threaded into a block 186 through which the cross rod 173 passes, with a jam nut 187 threaded on piston rod 185 and seating tightly against the block 186, the latter being pivoted on cross rod 173. The ends of the cross rod 173 extend through slightly elongated openings 188 in the upper ends of the L-shaped arms 171a of the exit stop, to accommodate rectilinear movement of the piston rod 185. Admission and exhaust of air to and from the cylinders C-1E, C-2E and C-3E are controlled by a solenoid operated valve SVE of suitable known type, preferably a valve known under the name of "Electroaire," though any suitable valve may be used. Compressed air is supplied to the valve SVE from any suitable source, through the main air supply conduit 142E, mounted in part on the load track LT and in part on the frame 102E, the conduit 142E being provided with an air filter FE, a pressure regulator PE and a lubricator LE. A conduit 143E is connected by a nipple 144E to the valve SVE and is connected at one end to the outer end of cylinder C–2E and at its other end to the outer end of cylinder C–3E. A second conduit 143E–2 is connected at one end to the nipple 144E and at its other end to the upper end of the cylinder C–1E. A third conduit 145E is connected by a nipple 146E to valve SVE, conduit 145E being connected at one end to the inner end of the cylinder C–3E and at its other end to the inner end of the cylinder C–2E. A fourth conduit 145E–2 is connected at one end to the nipple 146E and at its other end to the lower end of the cylinder C–1E. The conduits 143E, 143E–2, 145E and 145E–2 are suitably mounted on the frame 102E and are provided with appropriate fittings, as will be understood. The air control valve SVE is provided with two solenoids VSE–1 and VSE–2, shown in FIGURE 24, the function of which will be explained presently.

A limit switch LS–3E is mounted by brackets on the storage track B adjacent the inner end of the cylinder C–3E. The switch LS–3E is a micro-switch of known make and is provided with an operating arm 190 extending through a slot 191 in the top of track B, arm 190 being inclined downward toward the exit end of track B and positioned to be held raised, effective for closing switch LS–3E, by the leading wheel truck of a carrier positioned between the back stop pawl 168 and the ends of the arms 175 of the exit stop. A limit switch LS–1E is mounted by a bracket 192 on the top of the load track LT in advance of the escape switch unit H. The switch LS–1E is similar to the switch LS–3E and is likewise provided with an operating arm extending through a slot in the top wall of track LT, such arm being inclined downward and inward of the track in the direction of travel therealong of the carriers and being disposed to be raised by the leading wheel truck of a carrier traveling along track LT, effective for opening switch LS–1E, which normally is closed. A limit switch LS–2E is mounted at one side of the power track PT, the side thereof remote from the load track LT, on a suitable bracket 193. Switch LS–2E is normally open and is provided with a suitably formed operating arm 194 extending across the bottom slot in track PT and is disposed a short distance in advance of the switch LS–1E. A normally open limit switch LS–4E is mounted at the same side of the track PT as the switch LS–2E, by a suitable bracket 195 and is provided with an operating arm 196 extending across the slot in the bottom of the track PT, switch LS–4E being disposed a short distance in advance of the cylinder C–1E. As will be understood, the arms 194 and 196 of the switches LS–2E and LS–4E, respectively, are disposed to be actuated by the dogs 85 and 86 of the power chain PC traveling along the track PT, being first actuated by the leading dog 86 of each pair of dogs and then actuated by the following dog 85 of each pair. As above indicated, the switches LS–2E and LS–4E, as well as the switches LS–3E and LS–1E may be any suitable type of micro switches and are appropriately disposed on the tracks B, LT and PT, as will be understood. It will be understood that, in practice, the wiring for the electrical switches is enclosed in suitable protective conduits provided with the usual fittings. The track LT also has associated therewith a control relay CR of suitable known type mounted above track LT and shown positioned adjacent one side of the frame 102E. The control relay CR prevents delivery of a carrier from the storage track B to the load track LT except when an empty pair or set of pusher dogs is approaching the escapement switch unit H along the track PT, as will appear more fully presently. Referring to FIGURE 24, the control relay CR is connected across the power lines L–1 and L–2 in series with the switches LS–3E and LS–1E, the latter normally being closed and the former being held closed by the leading wheel truck of a carrier at the exit end of the track B, as previously explained. The switch LS–4E includes two sets of contacts, connected in shunt with the switches LS–3E, LS–1E, one set being connected in series with the control relay CR between the latter and the first pair of contacts cr-1 thereof, the latter being connected in series with the switches LS–3E and LS–1E. The second pair of contacts of switch LS–4E is connected across the line in series with solenoid VSE–2 of the air control valve SVE, when switch LS–4E is closed. The switch LS–2E is connected in series across the line with the second set of contacts cr-2 of the control relay CR and the solenoid VSE–1 of the air control valve SVE. When a carrier is properly positioned at the exit end of the storage track B, the switch LS–3E is held in its closed position shown in FIGURE 24, with the switch LS–1E remaining in its normally closed position and the switches LS–4E and LS–2E open.

The control relay CR is energized through its holding contacts cr–1, as will appear more fully presently. The leading dog 86 of an empty pair of dogs approaching the exit of escapement unit H closes switch LS–2E. Closing of switch LS–2E energizes solenoid VSE–1 of the air control valve SVE effective for exhausting air from the lower end of cylinder C–1E and the inner ends of cylinders C–2E and C–3E and admitting air under pressure to cylinder C–1E, between the upper end and piston 120–b thereof, and to the cylinders C–2E and C–3E, between the outer ends and the pistons 133b and 185b, respectively, thereof. The piston rods of the cylinders C–1E, C–2E and C–3E are thus projected, moving escapement stop 169 downward to effective holding position, raising arms 175 of the main exit stop means to carrier releasing position and swinging the primary stop arms 177 down to stop position, and swinging the sweep arm 126E clockwise. The released carrier is moved to position with its leading wheel truck abutting the stops 160 and the pusher bar 61 of the carrier remaining at the exit end of track B abuts the extensions 181 of the primary stop arms 177, as previously described. Shortly thereafter the leading pusher dog 86 of the approaching pair of dogs passes over the pusher arm 61 of the carrier positioned against the stop pawl 160 and then actuates the switch LS–4E, closing it and thereby energizing solenoid VSE–2 of the air control valve SVE, after which switch LS–4E returns to its normally open condition. That is effective for exhausting air from the upper end of cylinder C–1E and the outer ends of cylinders C–3E and C–2E, and admitting air under pressure to the lower end of cylinder C–1E and the inner ends of cylinders C–3E and C–2E. The piston rods of the cylinders are thereby retracted, raising stop pawl 160 to releasing position, swinging stop arms 171 downward to holding position and raising primary stop arms 177 to releasing position, allowing the then end carrier on track B to advance to position with its pusher bar 61 contacting the ends of stop arms 175, as previously described, and swinging sweep arm 126E counter-clockwise to its normal position. In the continued travel along track PT of the pusher dogs, the following dog 85 of the set or pair again closes switch LS–4E, thereby energizing LS–3E incident to delivery of the carrier from track B to stop pawl 160, and resetting relay CR for the next cycle of operations, switch LS–3E being then closed and held closed by the leading wheel truck of the then first carrier on the exit end of track B. The following dog 85 of the set then picks up the pusher bar 61 of the carrier delivered from track B and propels it along load track LT in the manner previously described.

The limit switch LS–1E normally is closed, as is the switch LS–3E, as above noted. In the event a carrier is being propelled along track LT by a pair of pusher dogs approaching escapement switch H, its leading wheel truck will open switch LS–1E, effective for preventing energizing of the control relay CR. Also, if the switch LS–3E is open—not held closed by the leading wheel truck of a carrier at the exit end of track B— its prevents energizing of the control relay CR. The switches LS–1E and LS–3E, in conjunction with the relay CR thus assure that the carrier delivery means of the escapement switch unit H will function only when an empty pair of pusher dogs is approaching the escapement switch and there is a carrier properly positioned on the track B for delivery therefrom, which is desirable for obvious reasons as conducive to assured and accurate operation of the escapement unit H.

As previously indicated, each of the storage tracks may be provided with one or more retarders suitably positioned therealong, one retarder being indicated at R in each of the storage tracks in the diagram of FIGURE 1. Referring to FIGURES 26 to 29, inclusive, each retarder comprises two friction members or rails 198 of angle cross section disposed at opposite sides of the associated storage track, track B for example, extending lengthwise thereof and pivoted at one end, at 199, to a U-shaped bracket 200 extending over and welded or otherwise suitably secured to track B. The rails 198 are of substantial length and are welded, a short distance from their other end, to the lower ends of the arms of a yoke 201 of generally inverted U-shaped straddling the track B. A mounting bracket 202 is welded to a base plate 203 extending transversely of and welded to the top of track B and projecting beyond the sides thereof. A spring return air cylinder 204 of suitable known type, preferably one known as an "Air-Mite" cylinder, is secured to the upper end or bight portion of bracket 202. The piston rod 205 of cylinder 204 extends vertically from the upper end thereof for contact with the bight portion of yoke 201 and is urged toward its lowered or retracted position by a compression spring 206 within cylinder 204 confined between the upper end thereof and piston 207 to which the lower end of piston rod 205 is suitably secured, as shown more clearly in FIGURE 29. An angle bracket 208 is welded to the inner side of each of the rails 198, in alignment with the lower end of the corresponding arm of yoke 201, and has threaded therethrough the lower end of a guide pin 209, threaded for a substantial portion of its length from its lower end and welded in bracket 208. The guide pins 209 are slidable through the end portions of plate 203 projecting beyond the sides of track B and receive compression springs 210 respectively confined between a washer 211 seating on the underface of plate 203 and a washer 212 seating on a lock nut 213 threaded on the lower portion of pin 209. As will be understood, the nuts 213 provide means for adjusting the compression of springs 210 to vary the downward pressure transmitted thereby to the end portions of the rails 198. Rails 198 are of substantial length and extend from the pivots 199 lengthwise of the track B in the direction of travel of carriers therealong. Preferably, each of the rails 198 is provided, a short distance from its free end, with a bolt 214 secured therethrough by a nut 215 with an intervening spring washer 216. When the piston rod 205 of cylinder 204 is in its retracted position, the free ends of the rails 198 are in lowered position with the rails 198 inclined downward away from track B in the direction of travel of the carriers along that track. The rails 198 are so disposed that, when in their lowered operative position, they will be contacted by the arms of the pusher bar 61 of a carrier entering the retarder. The compression springs 210 resist upward movement of the rails 198 by the arms of pusher bar 61 so as to exert a retarding or braking effect thereon. If travel of the carrier is not stopped by the pressure of the rails 198 on pusher arm 61, the bolts 214 provide positive stops for the carrier, as will be understood. In order to release a carrier held on track B by the retarder, the rails may be raised to an ineffective position in which the underfaces thereof and the heads of the bolts 214 are disposed to clear the arms of pusher bar 61. That is effected by admission of compressed air to cylinder 204 between the piston 207 and the lower end thereof, by means which will now be described.

Referring to FIGURES 28 and 29, an air conduit 219 connects the lower end of cylinder 204 to a solenoid operated air control valve 220, to which air is supplied, from a suitable source of compressed air, through a supply conduit 221 provided with an air filter 222, a pressure regulator 223 and a lubricator 224, all of suitable known type. The air control valve includes an operating solenoid 225 connected across the electric power lines L–1 and L–2 in series with a suitable switch 226, which may be operated either manually or by suitable known timing means and is normally open. As will be understood, a plurality of air control valves 220 may be connected across the lines L–1 and L–2 for operating a corresponding number of retarders which may be operated simultaneously. When the switch 226 is closed solenoid 225 of the air control valve 220 is energized effective for admitting compressed air to the lower end of cylinder 204 and projecting piston rod 205 thereof in opposition to the compression spring 206. That raises the retarder rails 198, in opposition to the compression springs 210, to their ineffective position above referred to. When the switch 226 is opened solenoid 225 is deenergized, effective for exhausting air from the lower end of cylinder 204, and piston rod 205 is retracted by the compression spring 206 permitting downward movement of the free ends of the retarder rails 198 with the yoke 201, under the influence of gravity supplemented by the compression springs 210, thereby returning the retarder rails 198 to their lowered operative position.

As above indicated, it will be understood that changes in detail may be resorted to without departing from the field and scope of our invention, and we intend to include all such variations, as fall within the scope of the appended claims, in this application in which the preferred form only of our invention has been disclosed.

We claim:

1. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit comprising a shiftable track member having a feed-in position effective for diverting a carrier from said load track to a pick-up position for transfer to said storage track and a straight-through position for continued travel of said carriers along said load track bypassing said unit, first power means for shifting said track member, second power means comprising a transfer member having a normal ineffective position and movable therefrom to an effective position, said transfer member having means cooperating with said carrier propelling members for picking up a carrier at said pick-up position and transferring it to said storage track in the movement of said transfer member to and from effective position, and control means actuated by a carrier on said load track approaching said unit and being transferred to said storage track, said control means being effective for energizing said first and second power means and thereby shifting said track member to feed-in position and for moving said transfer member to effective position and then again energizing said first and second power means and thereby shifting said track member to straight-through position and returning said transfer member to its said ineffective position incident to transfer of said carrier to said storage track.

2. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit comprising a shiftable track member having a feed-in position effective for diverting a carrier from said load track to a pick-up position for transfer to said storage track and a straight-through position for continued travel of said carriers along said load track by-passing said unit, power means for shifting said track member and transferring a carrier from said pick-up position to said storage track, said power means including a transfer member having an ineffective position and movable to an effective position, said transfer member comprising means cooperating with said carrier propelling members for picking up a carrier at said pick-up position and transferring it to said storage track incident to the movement of said transfer member from its said effective position, and control means successively actuated by a carrier on said load track approaching said unit and being transferred to said storage track, said control means being effective for energizing said power means and thereby shifting said track member to feed-in position and moving said transfer member to effective position and then shifting said track member to straight-through position and moving said transfer member from effective position incident to transfer of said carrier to said storage track.

3. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit comprising a shiftable track member having a feed-in position effective for diverting a carrier from said load track to a pick-up position for transfer to said storage track and a straight-through position for continued travel of said carriers along said load track by-passing said unit, power means for shifting said track member and transferring a carrier from said pick-up position to said storage track, said power means including a transfer member having an ineffective position and movable to an effective position, said transfer member comprising means cooperating with said carrier propelling members for picking up a carrier at said pick-up position and transferring it to said storage track incident to the movement of said transfer member from its said effective position, control means successively actuated by a carrier on said load track approaching said unit and being transferred to said storage track, said control means being effective for energizing said power means and thereby shifting said track member to feed-in position and moving said transfer member to effective position and then shifting said track member to straight-through position and moving said transfer member from effective position incident to transfer of said carrier to said storage track, and control means actuated by a carrier on the entrance end of said storage track when the latter is filled with carriers and effective for disabling said power means.

4. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track member having a feed-in position effective for diverting a carrier from said load track to a pick-up position for transfer to said storage track and a straight-through position for continued travel of carriers along said load track bypassing said unit, a first fluid pressure operated power cylinder having a piston rod with operating connection to said track member, a sweep arm having a normal ineffective position clear of the pusher bar of a carrier at said pick-up position and movable to an effective position, said arm having means disposed and adapted to engage the pusher bar of a carrier at said pick-up position when said sweep arm is moved to effective position and effective in the return movement of said arm to ineffective position for moving said carrier onto said storage track, a second fluid pressure operated power cylinder having a piston rod with operating connection to said arm, said piston rods of said cylinders being normally in one endwise position with said track member in its straight-through position and said sweep arm in its ineffective position, and control means successively actuated by a carrier on said load track approaching said unit and being transferred to said storage track, said control means being effective for first admitting pressure fluid to said cylinders at one end thereof thereby moving said piston rods to another endwise position and moving said track member to feed-in position and said arm to effective position and then admitting pressure fluid to the other end of said cylinders thereby moving said piston rods to said one endwise position and returning said track member to straight-through position and said arm to normal ineffective position.

5. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track member having a feed-in position effective for diverting a carrier from said load track to a pick-up position for transfer to said storage track and a straight-through position for continued travel of carriers along said load track bypassing said unit, a first fluid pressure operated power cylinder having a piston rod with operating connection to said track member, a sweep arm having a normal ineffective position clear of the pusher bar of a carrier at said pick-up position and movable to an effective position, said arm having means disposed and adapted to engage the pusher bar of a carrier at said pick-up position when said sweep arm is moved to effective position and effective in the return movement of said arm to ineffective position for moving said carrier onto said storage track, a second fluid pressure operated power cylinder having a piston rod with operating connection to said arm, said piston rods of said cylinders being normally retracted with said track member in its straight-through position and said sweep arm in its ineffective position, and control means successively actuated by a carrier on said load track approaching said unit and being transferred to said storage track, said control means being effective for first admitting pressure fluid to said cylinders at one end thereof thereby projecting said piston rods and moving said track member to feed-in position and said arm to effective position and then admitting pressure fluid to the other end of said cylinders thereby retracting said piston rods and returning said track member to straight-through position and said arm to normal ineffective position.

6. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track member having a feed-in position effective for diverting a carrier from said load track to a pick-up position for transfer to said storage track and a straight-through position for continued travel of carriers along said load track bypassing said unit, a first pneumatic power cylinder having a piston rod connected to said track member for shifting it, a sweep arm having a normal ineffective position clear of the pusher bar of a carrier at said pick-up position and movable to an effective position, said arm having means disposed and adapted to engage the pusher bar of a carrier at said pick-up position when said sweep arm is moved to effective position and effective in the return movement of said arm to ineffective position for moving the carrier onto said storage track, a second pneumatic power cylinder having a piston rod with operating connection to said arm, said piston rods of said cylinders being normally retracted with said track member in its straight-through position and said sweep arm in its ineffective position, and control means successively actuated by a carrier on said load track approaching said unit and being transferred to said storage track, said control means being effective for first admitting air under pressure to said cylinders at one end thereof thereby projecting said piston rods and moving said track member to feed-in position and said arm to effective position and then admitting air under pressure to the other end of said cylinders thereby retracting said piston rods and returning said track member to straight-through position and said arm to normal ineffective position.

7. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track member having a feed-in position effective for diverting a carrier from said load track to a pick-up position for transfer to said storage track and a straight-through position for continued travel of carriers along said load track bypassing said unit, a first pneumatic power cylinder having a piston rod connected to said track member for shifting it, a sweep arm having a normal ineffective position clear of the pusher bar of a carrier at said pick-up position and movable to an effective position, said arm having means disposed and adapted to engage the pusher bar of a carrier at said pick-up position when said sweep arm is moved to effective position and effective in the return movement of said arm to ineffective position for moving the carrier onto said storage track, a second pneumatic power cylinder having a piston rod with operating connection to said arm, said piston rods of said cylinders being normally retracted with said track member in its straight-through position and said sweep arm in its ineffective position, control means successively actuated by a carrier on said load track approaching said unit and being transferred to said storage track, said control means being effective for first admitting air under pressure to said cylinders at one end thereof thereby projecting said piston rods and moving said track member to feed-in position and said arm to effective position and then admitting air under pressure to the other end of said cylinders thereby retracting said piston rods and returning said track member to straight-through position and said arm to normal ineffective position, and control means actuated by a carrier on the entrance end of said storage track when the latter is filled with carriers and effective for disabling said power cylinders.

8. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track switch point having rectilineal movement to a feed-in position effective for diverting a carrier from said load track to a pick-up position for transfer to said storage track and a straight-through position for continued travel of carriers along said load track bypassing said unit, a first pneumatic power cylinder having a piston rod connected to said track switch point for shifting it, a sweep arm pivoted at one end on a vertical axis having a normal ineffective position clear of the pusher bar of a carrier at said pick-up position and swingable to an effective position, said arm having adjacent its other end means disposed and adapted to engage the pusher bar of a carrier at said pick-up position when said arm is swung to effective position and effective in the return movement of said arm to ineffective position for moving said carrier onto said storage track, a second pneumatic power cylinder pivoted on a vertical axis at one end and having a piston rod extending through its other end and pivoted to said arm on a vertical axis, said piston rods normally being in endwise positions holding said track switch point in straight-through position and said arm in ineffective position, and control means successively actuated by a carrier on said load track approaching said unit and being transferred to said storage track, said control means being effective for admitting air under pressure to said cylinders thereby moving said pistons to other positions and moving said track switch point to feed-in position and said sweep arm to effective position and then admitting air under pressure to said cylinders thereby moving said pistons to their said normal positions and moving said track switch point to straight-through position and said sweep arm to ineffective position.

9. In an overhead conveyor system, a main line comprising side by side load and power tracks, a storage track, load carriers adapted to travel along said load and storage tracks, pusher bars projecting laterally from said carriers, a pusher chain travelling along said power track and having pusher dogs disposed and adapted for pushing engagement with said pusher bars, a feed-in switch unit comprising a shiftable track switch point having rectilineal movement to a feed-in position effective for diverting a carrier from said load track to a pick-up position for transfer to said storage track and a straight-through position for continued travel of carriers along said load track bypassing said unit, a first pneumatic power cylinder having a piston rod connected to said track switch point for shifting it, a sweep arm pivoted at one end on a vertical axis having a normal ineffective position clear of the pusher bar of a carrier at said pick-up position and swingable to an effective position, said arm having adjacent its other end means disposed and adapted to engage the pusher bar of a carrier at said pick-up position when said arm is swung to effective position and effective in the return movement of said arm to ineffective position for moving said carrier onto said storage track, a second pneumatic power cylinder pivoted on a vertical axis at one end and having a piston rod extending through its other end and pivoted to said arm on a vertical axis, said piston rods normally being in endwise positions holding said track switch point in straight-through position and said arm in ineffective position, control means successively actuated by a carrier on said load track approaching said unit and being transferred to said storage track, said control means being effective for admitting air under pressure to said cylinders thereby moving said pistons to other positions and moving said track switch point to feed-in position and said sweep arm to effective position and then admitting air under pressure to said cylinders thereby moving said pistons to their said normal positions and moving said track switch point to straight-through position and said sweep arm to ineffective position, and control means actuated by a carrier on the entrance end of said storage track when the latter is filled with carriers and effective for disabling said power cylinders.

10. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit at one end of said storage track for diverting thereto carriers from said power track, carrier controlled power means independent of said pusher chain for operating said unit, and an escapement switch unit at the other end of said storage track for delivering carriers therefrom to said load track, said escapement switch unit comprising a shiftable track switch point having a delivery position effective for delivering a carrier to said load track and a straight-through position accommodating travel of a carrier on said load track past said unit, said switch point having contact surfaces and said carriers having contact members disposed to contact said surfaces and in cooperation therewith effective for shifting said switch point from either of said positions to its other position.

11. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit at one end of said storage track for diverting thereto carriers from said power track, carrier controlled power means independent of said pusher chain for operating said unit, and an escapement switch unit at the other end of said storage track for delivering carriers therefrom to said load track, said escapement switch unit comprising a shiftable track switch point having a delivery position effective for delivering a carrier to said load track and a straight-through position accommodating travel of a carrier on said load track past said unit, said switch point having contact surfaces at opposite sides thereof and said carriers having contact members disposed to contact said surfaces and in cooperation therewith effective for shifting said switch point from its straight-through position to its delivery position by a carrier being delivered to said load track and from its delivery position to its straight-through position by a carrier travelling on said load track.

12. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit at one end of said storage track for diverting thereto carriers from said power track, carrier controlled power means independent of said pusher chain for operating said unit, an escapement switch unit at the other end of said storage track for delivering carriers therefrom to said load track, and carrer and pusher chain controlled power means for operating said escapement switch unit, the latter comprising a shiftable track switch point mounted for rectilineal movement and having a delivery position effective for delivering a carrier to said load track and a straight-through position accommodating travel of a carrier on said load track past said unit, said switch point having contact surfaces at opposite sides thereof and said carriers having contact members disposed to contact said surfaces and in cooperation therewith effective for shifting said switch point from its straight-through position to its delivery position by a carrier being delivered to said load track and from its delivery position to its straight-through position by a carrier travelling on said load track.

13. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, a feed-in switch unit at one end of said storage track for diverting thereto carriers from said power track, carrier controlled power means independent of said pusher chain for operating said unit, an escapement switch unit at the other end of said storage track for delivering carriers therefrom to said load track, carrier and pusher chain controlled power means for operating said escapement switch unit, supplementary carrier controlled means for rendering said escapement switch power means ineffective responsive to improper positioning of a carrier in said escapement switch unit and responsive to a carrier approaching said escapement switch unit on said load track, said escapement switch unit comprising a shiftable track switch point having a delivery position effective for delivering a carrier to said load track and a straight-through position accommodating travel of a carrier on said load track past said escapement switch unit, said switch point and said carriers having cooperating means effective for shifting said switch point from its straight-through position to its delivery position by contact with said switch point of a carrier being delivered to said load track and from its delivery position to its straight-through position by contact with said switch point a carrier travelling on said load track.

14. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, and an escapement switch unit at one end of said storage track for delivering carriers therefrom to said load track, said unit comprising a shiftable track switch point having a delivery position effective for delivering a carrier to said load track and a straight-through position accommodating travel of a carrier on said load track past said unit, said switch point and said carriers having cooperating means effective for shifting said switch point from either of said positions to its other position by contact with said switch point of carriers travelling along said tracks.

15. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, and an escapement switch unit at one end of said storage track for delivering carriers therefrom to said load track, said unit comprising a shiftable track switch point having rectilineal movement to a delivery position effective for delivering a carrier to said load track and a straight-through position accommodating travel of a carrier on said load track past said unit, said switch point and said carriers having cooperating means effective for shifting said switch point from its straight-through position to its delivery position by contact therewith of a carrier being delivered to said load track and from its delivery position to its straight-through position by contact with said switch point of a carrier travelling on said load track.

16. In an overhead conveyor system, a main line comprising side by side load and power tracks, a storage track, load carriers adapted to travel along said load and storage tracks, a pusher chain travelling along said power track, cooperating propelling members carried by said chain and carriers for propelling the latter along said load track, an escapement switch unit at one end of said storage track for delivering carriers therefrom to said load track, carrier and pusher chain controlled power means for operating said unit, and supplementary carrier controlled means for rendering said power means ineffective responsive to improper positioning of a carrier in said unit and responsive to a carrier approaching said unit on said load track, said unit comprising a shiftable track switch point having rectilineal movement to a delivery position effective for delivering a carrier to said load track and a straight-through position accommodating travel of a carrier on said load track past said unit, said switch point having at opposite sides thereof contact surfaces and said carriers having contact members disposed to contact said surfaces and in cooperation therewith effective for shifting said switch point from its straight-through position to its delivery position by a carrier being delivered to said load track and from its delivery position to its straight-through position by a carrier travelling on said load track.

References Cited in the file of this patent

UNITED STATES PATENTS

| | | |
|---|---|---|
| 791,091 | Gamalielson | May 30, 1905 |
| 1,980,206 | Keen | Nov. 13, 1934 |
| 2,684,039 | King | July 20, 1954 |
| 2,688,931 | Spafford | Sept. 14, 1954 |
| 2,688,932 | Heil | Sept. 14, 1954 |
| 2,714,355 | Benson | Aug. 2, 1955 |
| 2,868,138 | Bishop et al. | Jan. 13, 1959 |
| 2,875,704 | Yates | Mar. 3, 1959 |
| 2,918,881 | Klamp et al. | Dec. 29, 1959 |